United States Patent
Meyer

(10) Patent No.: US 10,701,447 B2
(45) Date of Patent: Jun. 30, 2020

(54) SYSTEMS AND METHODS FOR SLOWING DOWN FAST-ACCESS PLAYBACK OPERATIONS

(71) Applicant: Rovi Guides, Inc., San Jose, CA (US)

(72) Inventor: Samuel Meyer, Boston, MA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/343,843

(22) PCT Filed: Nov. 18, 2016

(86) PCT No.: PCT/US2016/062677
§ 371 (c)(1),
(2) Date: Apr. 22, 2019

(87) PCT Pub. No.: WO2018/093375
PCT Pub. Date: May 24, 2018

(65) Prior Publication Data
US 2019/0261056 A1    Aug. 22, 2019

(51) Int. Cl.
*H04N 5/783* (2006.01)
*H04N 21/472* (2011.01)
(Continued)

(52) U.S. Cl.
CPC ..... *H04N 21/47217* (2013.01); *G11B 27/005* (2013.01); *H04N 21/2387* (2013.01);
(Continued)

(58) Field of Classification Search
CPC ............... G01S 7/487; H01L 27/14609; H01L 27/14601; H01L 27/14643
(Continued)

(56) References Cited

U.S. PATENT DOCUMENTS 6,239,794 B1    5/2001    Yuen et al.
6,564,378 B1    5/2003    Satterfield et al.
(Continued)

FOREIGN PATENT DOCUMENTS

EP    1 626 408    2/2006
EP    1 748 438    1/2007
WO    WO 2016179386    11/2016

OTHER PUBLICATIONS

International Search Report and Written Opinion of PCT/US2016/062677 dated Jul. 17, 2017.
(Continued)

*Primary Examiner* — Helen Shibru
(74) *Attorney, Agent, or Firm* — Haley Guiliano LLP

(57) ABSTRACT

Systems and methods for performing fast-access playback operations are provided. A viewing history is stored that includes a plurality of play positions within a media asset that are associated with user interactions. A user request is received to perform a fast-access playback operation while accessing the media asset. While performing the fast-access playback operation at a first rate, it is determined whether a current fast-access playback position is within a threshold distance from a given one of the plurality of play positions stored in the viewing history. The fast-access playback operation is slowed down from the first rate to a second rate while the current fast-access playback position is within the threshold distance from the given play position.

20 Claims, 7 Drawing Sheets

(51) Int. Cl.
 G11B 27/00 (2006.01)
 H04N 21/432 (2011.01)
 H04N 21/442 (2011.01)
 H04N 21/45 (2011.01)
 H04N 21/4147 (2011.01)
 H04N 21/6587 (2011.01)
 H04N 21/845 (2011.01)
 H04N 21/2387 (2011.01)

(52) U.S. Cl.
 CPC ..... *H04N 21/4147* (2013.01); *H04N 21/4325* (2013.01); *H04N 21/44222* (2013.01); *H04N 21/4532* (2013.01); *H04N 21/47202* (2013.01); *H04N 21/6587* (2013.01); *H04N 21/8455* (2013.01)

(58) Field of Classification Search
 USPC .......................................................... 386/350
 See application file for complete search history.

(56) References Cited

U.S. PATENT DOCUMENTS

| | | | |
|---|---|---|---|
| 7,165,098 B1 | 1/2007 | Boyer et al. | |
| 7,761,892 B2 | 7/2010 | Ellis et al. | |
| 8,046,801 B2 | 10/2011 | Ellis et al. | |
| 8,233,772 B1* | 7/2012 | Young | H04N 5/783 386/278 |
| 2002/0174430 A1 | 11/2002 | Ellis et al. | |
| 2003/0093803 A1* | 5/2003 | Ishikawa | H04N 7/17318 725/94 |
| 2005/0251827 A1 | 11/2005 | Ellis et al. | |
| 2009/0207140 A1* | 8/2009 | Hansson | G06F 3/04883 345/173 |
| 2010/0077435 A1 | 3/2010 | Kandekar et al. | |
| 2010/0153885 A1 | 6/2010 | Yates | |
| 2010/0220974 A1 | 9/2010 | Yamashita et al. | |
| 2013/0311575 A1 | 11/2013 | Woods et al. | |
| 2015/0163558 A1* | 6/2015 | Wheatley | G06F 16/743 725/12 |
| 2015/0169157 A1* | 6/2015 | Lu | H04N 21/4333 715/716 |
| 2019/0320219 A1* | 10/2019 | Yoden | H04N 21/42204 |

OTHER PUBLICATIONS

International Preliminary Report of Patentability of PCT/US2016/062677 dated Jan. 9, 2019.

* cited by examiner

700

710 — Store a Viewing History that Includes a Plurality of Play Positions within a Media Asset that are Associated with User Interactions 720 — Receive a User Request to Perform a Fast-access Playback Operation While Accessing the Media Asset 730 — While Performing the Fast-access Playback Operation at a First Rate, Determine Whether a Current Fast-access Playback Position is within a Threshold Distance from a Given One of the Plurality of Play Positions Stored in the Viewing History 740 — Slow Down the Fast-access Playback Operation from the First Rate to a Second Rate While the Current Fast-access Playback Position is within the Threshold Distance from the Given Play Position

FIG. 7

SYSTEMS AND METHODS FOR SLOWING DOWN FAST-ACCESS PLAYBACK OPERATIONS

CROSS-REFERENCE TO RELATED APPLICATIONS

This application is a national stage application under 35 U.S.C. § 371 of International Application PCT/US2016/062677, filed Nov. 18, 2016. The disclosure of which is hereby incorporated by reference herein in its entirety.

BACKGROUND

Typical systems allow users to fast-forward and rewind through content at many different rates (e.g., 2×, 4×, 8×, etc.). However, when performing such operations, a user typically overshoots (goes too far beyond) a desired position towards which the user is fast-forwarding or rewinding. This results in the user having to perform the opposite operation at a slower rate to return to the desired position. For example, the user may fast-forward past a particular point because the fast-forward rate is too high and then has to rewind back to the particular point at a slower rate.

In order to address these inefficiencies, conventional systems mark segments having predetermined content as potentially desirable to a user (e.g., action scenes, plot segments, non-commercial segments). While a fast-forward or rewind operation is being performed, these conventional systems may slow down the fast-forward or rewind operation rate during these potentially desirable segments. However, these systems lack any capability to dynamically change the segments around which the rates of fast-forward and rewind operations are reduced. Such lack of flexibility results in the rates of fast-forward and rewind operations being reduced in portions of content the user may not necessarily be interested in while maintaining high fast-forward and rewind operation rates during portions the user is interested in. In addition, even when these systems do slow down the fast-forward or rewind operation rates for content the user is interested in, these systems only do so for the exact length of the segments and lack the flexibility adjusting the length of time for which the rate of the operations is reduced.

SUMMARY

Accordingly, methods and systems are disclosed herein for slowing down fast-access playback operations. In some embodiments, a user's interactions with a media asset may be monitored and maintained. For example, the user's latest viewed position or earliest viewed position may be maintained. The user may request to perform a fast-access playback operation (e.g., fast-forward or rewind) while watching the media asset from some other position. The user may request this operation in an attempt to reach the latest or earliest viewed position. Initially, the media guidance application may perform the requested fast-access playback operation at a high rate (e.g., 8×) to reach the desired position quickly. Upon reaching a threshold distance from the desired position (e.g., 0:05 play seconds away from the play position), the media guidance application may slow down the fast-access playback operation to a second rate (e.g., 1.5×). This allows the user to refresh his or her memory of the segments of the media asset that led up to the previously viewed position. The user may also terminate the fast-access playback operation close to the latest or earliest viewed position without overshooting that position because the fast-access playback operation is performed at a very slow rate.

In some embodiments, a media guidance application may maintain and store a viewing history. The viewing history may include a plurality of play positions within a media asset that are associated with user interactions. In some implementations, the user interactions may include a user request to perform a media guidance function while the user is accessing the media asset, wherein the playback function includes at least one of a fast-access playback operation, sharing the media asset, transmitting a social network communication to another user, and pausing the media asset.

The media guidance application may receive a user request to perform a fast-access playback operation while accessing the media asset. While performing the fast-access playback operation at a first rate, the media guidance application may determine whether a current fast-access playback position is within a threshold distance from a given one of the plurality of play positions stored in the viewing history. The media guidance application may slow down the fast-access playback operation from the first rate to a second rate while the current fast-access playback position is within the threshold distance from the given play position.

In some embodiments, user interactions with a media asset may be monitored while the user is accessing the media asset. A plurality of play positions within the media asset may be identified that is each associated with one of the monitored user interactions. A viewing history that includes the identified plurality of play positions within a media asset may be stored based on the monitored user interactions.

In some embodiments, a user request to perform a fast-access playback operation may be received while accessing the media asset. The fast-access playback operation may be performed at a first rate. A threshold distance may be computed for slowing down the fast-access playback operation based on the first rate and/or the second rate. While performing the fast-access playback operation, a current fast-access playback position, as adjusted based on the threshold distance, may be compared with each of (or one of or some of) the plurality of play positions stored in the viewing history. The media guidance application may determine whether the current fast-access playback position, as adjusted based on the threshold distance, overlaps a given one of the plurality of play positions stored in the viewing history. While the current fast-access playback position, as adjusted based on the threshold distance, overlaps the given play position, the media guidance application may set a value indicating a need to slow down the fast-access playback operation. The media guidance application may slow down the fast-access playback operation from the first rate to a second rate while the value indicating the need to slow down the fast-access playback operation is set.

In some implementations, the fast-access playback operation includes at least one of rewinding, fast-forwarding, and skipping segments. In some implementations, the threshold distance may be proportional to a rate of the fast-access playback operation.

In some embodiments, the threshold distance may be selected from one of a plurality of threshold distances. The media guidance application may determine a duration of the media asset. The media asset duration may be partitioned into a plurality of segments. A first threshold distance of the plurality of threshold distances may be associated with a first segment of the plurality of segments. A second threshold distance of the plurality of threshold distances may be associated with a second segment of the plurality of segments, wherein the second threshold distance is less than the first threshold distance. The first segment may correspond to an earlier play position than a play position of the second segment.

In some embodiments, the media guidance application may receive a user selection of a duration for slowing down a fast-access playback operation rate. The media guidance application may adjust the threshold distance based on the duration selected by the user. For example, the user may request that the fast-access playback operation be slowed down for a particular period of time. The period of time is the amount of time the fast-access playback operation is performed at the slower rate and is not the play time of the media asset. In particular, the user may desire to have a total of five seconds to review a portion of the media asset at a slower rate during a fast-access playback operation. For example, the user may desire to review in five seconds a portion of the media asset that precedes the last access point of the user at a fast-access rate of 1.5×. In such circumstances, the user may review play positions in the range of 1:30 (min:sec) to 2:30 (min:sec) in five seconds. The duration of time may be specified by the user and may vary based on the play position at which the fast-access playback operation rate is reduced.

In some embodiments, the threshold distance may be computed by determining a number of frames being skipped per second based on the first rate (e.g., the initial rate of the fast-access playback operation) and/or the second rate (e.g., the slowed down rate of the fast-access playback operation). The number of frames being skipped per second may be multiplied by a predetermined duration to determine a fast-access buffer amount. The threshold distance may be computed based on a function of the fast-access buffer amount.

In some embodiments, the threshold distance may be computed by dividing the fast-access buffer amount in half or into two portions. A fast-access playback window for the current fast-access playback position may be generated based on the computed threshold distance. A first end of the fast-access playback window may correspond to a first amount of frames that precede the current fast-access playback position by the computed threshold distance. A second end of the fast-access playback window may correspond to a second amount of frames that follows the current fast-access playback position by the computed threshold distance. Play positions corresponding to the first and second ends of the fast-access playback window may be identified. The media guidance application may determine whether the given play position is between the first and second ends of the fast-access playback window to determine whether the current fast-access playback position, as adjusted based on the threshold distance, overlaps the given play position.

In some embodiments, the threshold distance may be computed by dividing the fast-access buffer amount in half or into two portions. A fast-access playback window for the current fast-access playback position may be generated based on the computed threshold distance. A first end of the fast-access playback window may correspond to a first amount of play time that precedes a given one of the play positions in the viewing history by a first of the two portions. A second end of the fast-access playback window may correspond to a second amount of play time that follows the given one of the play positions in the viewing history by a second of the two portions. Play positions corresponding to the first and second ends of the fast-access playback window may be identified. The media guidance application may determine whether the current fast-access position is between the first and second ends of the fast-access playback window to determine whether the current fast-access playback position, as adjusted based on the threshold distance, overlaps the given play position.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIGS. 7-9 are illustrative flow diagrams for slowing down fast-access playback operations in accordance with some embodiments of the disclosure.

DETAILED DESCRIPTION

Figure 1:
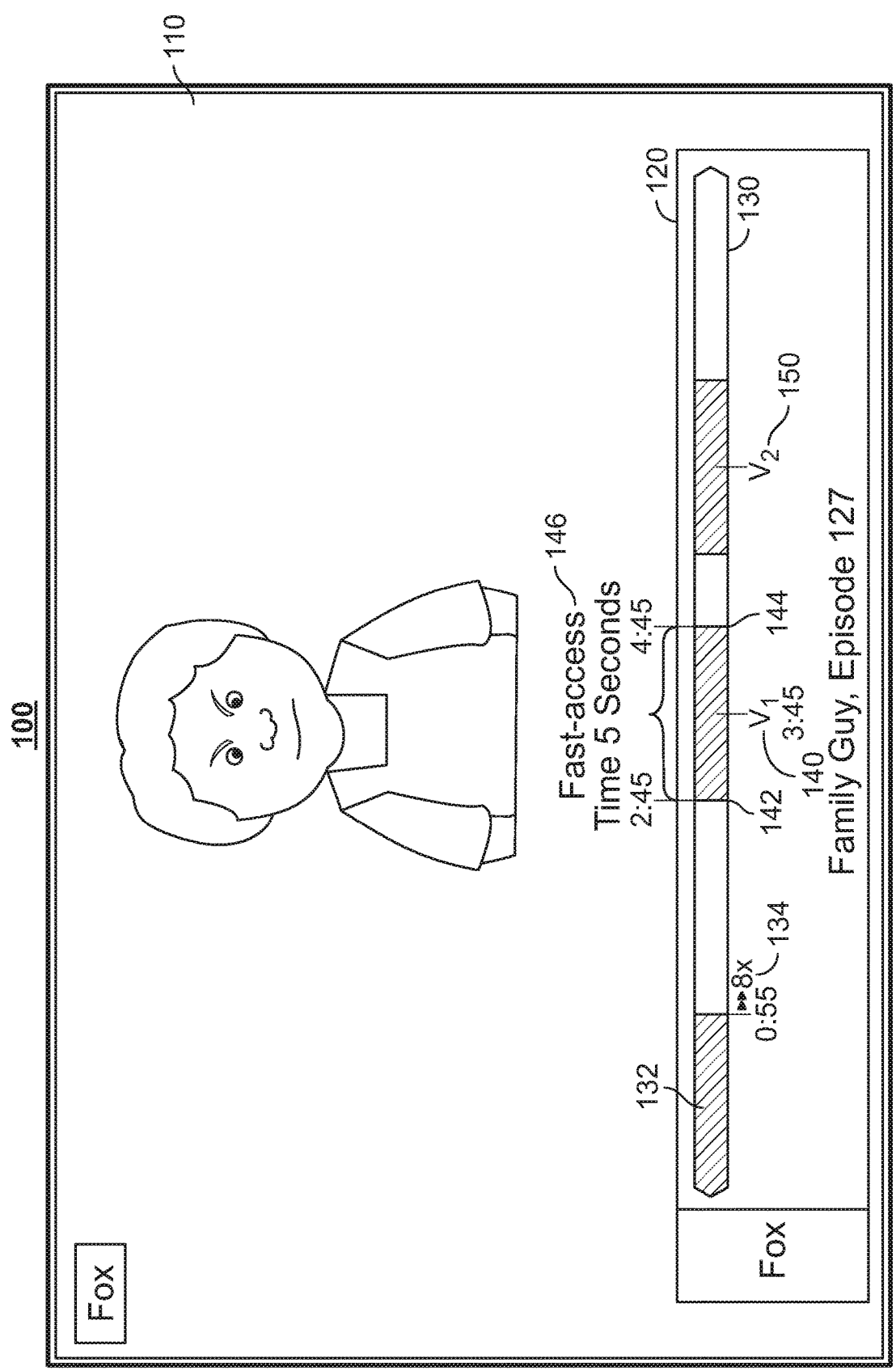
FIG. 1 shows an illustrative display screen that may be used to provide an interface for slowing down fast-access playback operations in accordance with an embodiment of the disclosure.

Methods and systems are disclosed herein for slowing down fast-access playback operations. In particular, the described methods and systems reduce a default rate or first rate at which a fast-access playback operation is performed around play positions that have previously been viewed by the user. Accordingly, when the user is fast-forwarding through content, for example, the system starts fast-forwarding at one rate and slows down the fast-forwarding operation when the system reaches a previously viewed play position. This allows the user to easily review the previously viewed play position and terminate the fast-forward operation closer to a desired point with greater precision than conventional systems. Namely, because the fast-forward operation is slowed down in a program segment the user previously viewed, the user can more precisely decide when to stop the fast-forward operation (e.g., within a certain amount of frames of where the user last accessed the content).

As referred to herein, the term "first rate" refers to the initial rate at which a fast-access playback operation is performed. This rate may be user specified by pressing a fast-access button (fast-forward) one or more times. The more times the button is pressed the higher the first rate. As referred to here, the term "second rate" refers to the slowed down rate of the fast-access playback operation as determined and controlled automatically by the media guidance application. The second rate refers to the rate, slower than the first rate, that the media guidance application to which the media guidance application reduces a given fast-access playback operation when approaching a given play position (e.g., a play position from a viewing history of a user).

In some embodiments, a viewing history may be maintained for a given user or users. The viewing history may identify every point or some points within a media asset at which some user interaction was received. For example, the viewing history may identify a first point within the media asset where a user request to pause the media asset was received. In addition, the viewing history may identify a second point within the media asset where a user request to rewind the media asset was received. In addition, the viewing history may identify a third point within the media asset when a user request to post a comment about the media asset was detected. The interactions stored within the viewing history may indicate the play position within a media asset at which any one or combination of the following or other interactions was started or performed: fast-access playback operation, communication with another user, posting to a social network, browsing using a second screen device, talking, searching for content, gazing away from a screen displaying the media asset, etc.

In some embodiments, while a user is consuming a given media asset, a user request to perform a fast-access playback operation may be received. In response to receiving the user request to perform the fast-access playback operation, the viewing history of the media asset for the user may be retrieved. The viewing history may be processed to identify a plurality of play positions at which user interactions with the media asset were detected.

As referred to herein, the phrase "fast-access playback operations" or "fast-access operation" should be understood to mean any operation that pertains to playing back a linear or non-linear media asset faster than normal playback speed or in a different order than the media asset is designed to be played, such as a fast-forward, rewind, skip, chapter selection, segment selection, skip segment, jump segment, next segment, previous segment, skip advertisement or commercial, next chapter, previous chapter or any other operation that does not play back the media asset at normal playback speed. The fast-access playback operation may be any playback operation that is not "play," where the play operation plays back the media asset at normal playback speed.

The fast-access playback operation may be performed at a first rate (e.g., 8×). This rate may be a default rate or a user-selected rate. As the user approaches one of the retrieved previously viewed play positions, the fast-access playback operation rate may automatically be reduced to a second rate (e.g., 1.5×). In some embodiments, the fast-access playback operation rate may automatically be reduced to the second rate only for the latest or earliest one of the retrieved play positions. In some embodiments, the rate to which fast-access playback operation rate is automatically reduced may vary from one of the retrieved previously viewed play positions to another.

The fast-access playback operation may continue to be performed through the media asset at the second rate from a point that precedes the previously viewed play position to another point that follows the previously viewed play position. If the user does not terminate the fast-access playback operation after the fast-access playback operation passes the point that follows one of the retrieved viewed play positions, the fast access playback operation rate may be increased back to the first rate (e.g., 8×) or some other rate that is greater than the second rate.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application, a media application, a master media application, or a guidance application. In some embodiments, a plurality of applications is implemented on a given device.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer-readable media or machine-readable media. Computer- or machine-readable media include any media capable of storing data. The computer- or machine-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.)), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

In some embodiments, as users view media assets, the media guidance application keeps track of each user's viewing position (or viewing progress). In some implementations, the media guidance application may maintain or store a viewing history or viewing data structure for each of the users. The viewing history may include fields that identify a media asset and viewing position field identifying viewing positions at which a user interaction was detected. For example, if a given user paused or stopped viewing a given media asset before the end of the media asset, the media guidance application may indicate the last accessed viewing position (e.g., 23 minutes into the media asset).

In some embodiments, the media guidance application may receive a user request to access a media asset (e.g., the program "Family Guy"). In some embodiments, the media guidance application may track or monitor the user's interactions through the media asset. As each interaction is detected, the media guidance application may update a viewing history for the user with the play position at which the interaction was detected. For example, the media guidance application may store in the viewing position field associated with the media asset field corresponding to the viewed media asset the play position at which the interaction was detected. The media guidance application may monitor the user interaction with the media asset across multiple sources and platforms. The media guidance application may update the viewing history to reflect the user interactions with the media asset across the different platforms and sources. For example, a user may access a given media asset through a video-on-demand source and may stop watching the media asset at a certain play position (e.g., play position 3:45). At another time, the user may access the same media asset from a linear source and may pause the media asset at another play position (e.g., play position 1:45). The media guidance application may store in the viewing history these two interactions for the same media asset.

FIG. 1 shows an illustrative display screen 100 that may be used to provide an interface for slowing down a fast-access playback operation in accordance with an embodiment of the disclosure. Screen 100 includes a media asset 110 (e.g., the program "Family Guy") and an information region 120. In some embodiments, in response to the user requesting access to the media asset (e.g., the program "Family Guy"), the media guidance application may present screen 100 showing video of selected media asset 110. In some embodiments, the selected media asset may have already been accessed at an earlier time by the user. In such circumstances, the media guidance application may retrieve the play positions previously accessed by the user from the viewing history of the user.

Information region 120 may include a title of media asset 110 and other information (e.g., description information) (not shown). Information region 120 may include a transport bar 130, which may include a viewing progress indicator 132, first previously detected interaction point 140 and second previously detected interaction point 150. Viewing progress indicator 132 may indicate how much of the media asset the given user has watched relative to a starting point and may be displayed as a particular color, shade, shape, etc. Previously detected interaction points 140 and 150 may reflect the play positions identified in the viewing history for the user.

In some embodiments, the media guidance application may receive a user request to perform a fast-access playback operation while the user consumes media asset 110. In response, the media guidance application may start performing the fast-access playback operation at a first rate (e.g., 8×). The media guidance application may present a fast-access cursor 134 in transport bar 130 to inform the user of the current fast-access play position. The current fast-access play position may correspond to a particular frame of the media asset. In some implementations, this frame may be presented to the user. In some implementations, the rate at which the fast-access playback operation is performed corresponds to a number of frames per second that are presented to the user. Accordingly, the greater the rate the more frames per second that are presented to the user. In some embodiments, a greater rate of a fast-access playback operation may correspond to a greater number of frames that are skipped per second.

In some embodiments, the media guidance application may compute a threshold distance for each of (or at least one of) the play positions retrieved from the viewing history. The threshold distance may indicate how close or far the current fast-access position needs to be to a given one of the play positions in the viewing history before the fast-access playback operation is slowed down. For example, a threshold distance of 100 frames may indicate that when the current fast-access position is within 100 frames of the frame corresponding to a given one of the play positions in the viewing history, the media guidance application may reduce the rate of the fast-access playback operation from a first rate to a second rate.

Figure 2:
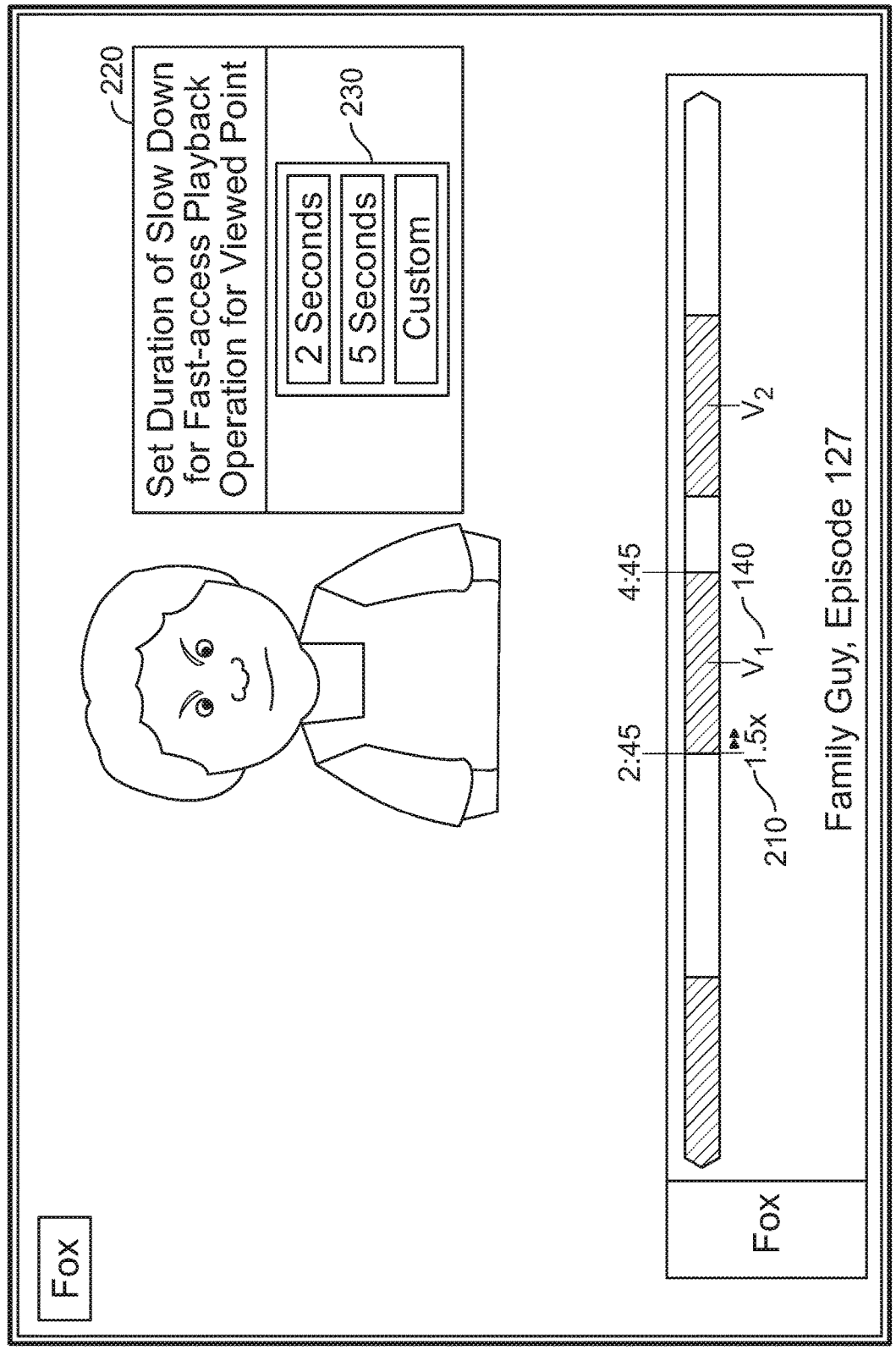
FIG. 2 shows an illustrative display screen that may be used to slow down fast-access playback operations with an embodiment of the disclosure.

FIG. 2 shows an exemplary user interface 200 of the fast-access playback operation being slowed down. As shown in user interface 200, current fast-access position is within a threshold distance from play position 140. As such, the media guidance application automatically reduces the rate of the fast-access playback operation from the first rate (e.g., 8×) to a second rate 210 (e.g., 1.5×). If the media guidance application does not receive user request to stop or terminate the fast-access play operation (e.g., by pressing a PLAY or STOP button), the media guidance application continues to perform the fast-access playback operation at the second rate until the current fast-access position is no longer within the threshold distance of the given play position 140. In some implementations, the threshold distance may only be applied to positions that precede a given play position from the viewing history. In some implementations, the threshold distance may only be applied to positions that follow a given play position from the viewing history. In some implementations, the threshold distance may be applied to positions that precede and follow a given play position from the viewing history.

Referring back to FIG. 1, in some embodiments, the threshold distance may be generated based on a window associated with the fast-access cursor 134. As fast-access cursor 134 advances while the fast-access playback operation is being performed, this window may overlap a first play position 142 that precedes a given previously viewed play position 140 and/or a second play position 144 that follows previously viewed play position 140. In some embodiments, the media guidance application may generate the window around the current fast-access position (e.g., fast-access cursor 134). In some embodiments, the media guidance application may generate the window around some or all of the play positions retrieved from the user's viewing history. In some implementations, the media guidance application may generate the window around only the latest or earliest play position retrieved from the user's viewing history.

The media guidance application may generate the window based on the first rate of the fast-access playback operation and/or the second rate of the fast-access playback operation and a duration for slowing down the fast-access playback operation. For example, the window may be larger (cover more play positions) for greater fast-access playback operation rates and smaller for smaller fast-access playback operation rates. Similarly, as the duration for slowing down the fast-access playback operation increases, the window may increase in size.

In some embodiments, the size of the window may be expressed as a function of the second rate of the fast-access playback operation (e.g., the slower rate of the fast-access playback operation) and duration. The size of the window (in number of frames) may be computed in accordance with $W_s = FA_{rate} * Duration$, where $W_s$ is the window size (in number of or frames), $FA_{rate}$ is the second rate of the fast-access playback operation, and Duration is the amount of time the fast-access playback operation is to be performed at the second slower rate than the first rate (this is the actual time for performing the fast-access playback operation and not the amount of time elapsed or skipped over in the media asset). To determine amount of play time (e.g., how much play positions) that are covered by the window size, the $W_s$ may be divided by 24 frames per second (normal play rate). For example, the second rate of the fast-access playback operation may be 1.5× which may skip 36 frames per second. The duration may be equal to five seconds which results in a window size ($W_s$) of 180 frames. The media guidance application may look ahead and behind the current fast-access position by 180 frames to determine if that frame matches a frame corresponding to one of the play positions in the viewing history. Alternatively, the media guidance application may look ahead and behind a given one of the play positions in the viewing history by 180 frames to select a particular frame and determine whether the current fast-access play position identifies that particular frame. If so, the media guidance application may slow down the fast-access playback operation to the second rate until the current fast-access position reaches the one of the play positions in the viewing history. In some implementations, the media guidance application may divide the 180 frames of the window size by normal playback rate (e.g., 24 frames per second) to determine that the 180 frames covers 0:08 (min:sec) playtime. In such circumstances, may look ahead and behind the current fast-access position by 0:08 play positions (e.g., may look ahead 0:04 play positions and behind by 0:04 play positions) to determine if that play position overlaps one of the play positions in the viewing history. Alternatively, the media guidance application may look ahead and behind a given one of the play positions in the viewing history by 0:08 play positions to select a particular play position and determine whether the current fast-access play position overlaps that particular play position. If so, the media guidance application may slow down the fast-access playback operation to the second rate until the current fast-access position reaches the one of the play positions in the viewing history. The process for generating the window is discussed in more detail in connection with FIGS. 7-9. This duration of the window for slowing down the fast-access playback operation may be referred to throughout as "duration".

In some embodiments, while a fast-access playback operation is being performed by the media guidance application, the media guidance application may retrieve a list of play positions stored in a viewing history of the user. The media guidance application may determine a fast-access play position 134 of a fast-access playback operation. The media guidance application may retrieve the window and divide the window in two equal or non-equal halves. Each half of the window may indicate an amount by which to look ahead past current fast-access play position 134. The media guidance application may compute a range of play positions by decrementing current fast-access play position 134 by one of the halves of the window and incrementing current fast-access position 134 by a second one of the halves of the window. The media guidance application may continue to update the range of play positions as current fast-access play position 134 advances through the media asset.

The media guidance application may determine whether one of the play positions retrieved from the viewing history is between the computed range of play positions. In response to determining that one of the play positions retrieved from the viewing history is between the computed range of play positions, the media guidance application may slow down the fast-access playback operation to a second rate. The media guidance application may continue to update the range of play positions as the current fast-access play position advances and determine whether one of the play positions retrieved from the viewing history is between the computed range of play positions while performing the fast-access playback operation at the slower rate. In response to determining that one of the play positions retrieved from the viewing history is no longer between the computed range of play positions, the media guidance application may increase the fast-access playback operation back to the first rate.

In some embodiments, the media guidance application may visually distinguish the window around fast-access cursor 134 using a specific color or shading pattern from consumed portion 132 and play positions 140 and 150. This allows the user to see how close or far the current fast-access position is to a given play point before being slowed down automatically by the media guidance application. In some embodiments, the media guidance application may present the window around fast-access cursor 134 in response to receiving a user request to perform the fast-access playback operation. In some embodiments, the media guidance application may remove the window that is presented around fast-access cursor 134, while performing a fast-access playback operation, in response to receiving a user request to terminate the fast-access playback operation.

In some embodiments, while a fast-access playback operation is being performed by the media guidance application, the media guidance application may retrieve a list of play positions stored in a viewing history of the user. The media guidance application may determine a fast-access play position 134 of a fast-access playback operation. The media guidance application may select one of the retrieved play positions from the viewing history and retrieve the window. The media guidance application may divide the window in two equal or non-equal halves. Each half of the window may indicate an amount by which to look ahead and behind the selected play position from the viewing history. The media guidance application may compute a range of play positions for the selected play position by decrementing the selected play position by one of the halves of the window and incrementing the selected play position by a second one of the halves of the window. The media guidance application may continue to monitor current fast-access play position 134, while performing the fast-access playback operation to determine whether current fast-access play position 134 is within the range of play positions surrounding the selected play position.

In some embodiments, the media guidance application may determine whether a window around one of the play positions retrieved from the viewing history overlaps current fast-access play position 134. In response to determining that window around one of the play positions includes a play position that overlaps with current fast-access play position 134, the media guidance application may slow down the fast-access playback operation to a second rate. In response to determining that window around one of the play positions includes a play position that no longer overlaps with current fast-access play position 134, the media guidance application may speed up the fast-access playback operation to back to the first rate.

In some embodiments, the media guidance application may visually distinguish the window around each play position 140 and 150 (or one of the play positions) using a specific color or shading pattern. This allows the user to see how close or far the current fast-access position 134 is to a given play point before the fast-access playback operation is slowed down automatically by the media guidance application. In some embodiments, the media guidance application may present the window around each play position 140 and 150 (or one of the play positions) in response to receiving a user request to perform the fast-access playback operation. In some embodiments, the media guidance application may remove the window that is presented around each play position 140 and 150 (or one of the play positions), while performing a fast-access playback operation, in response to receiving a user request to terminate the fast-access playback operation.

The duration may represent an amount of time the fast-access playback operation is performed at a second slower rate through a segment of content. The duration may represent the actual time perceived by the user rather than the time between play positions in the media asset. For example, the duration may be set to five seconds. In such circumstances, when the window associated with the fast-access playback operation overlaps with a given position from the viewing history, the media guidance application may slow down the fast-access playback operation for five seconds while continuing to perform the fast-access playback operation at the slower rate. This gives the user a total of five seconds to review the segment associated with the given play position at a second fast-access rate that is slower than the first rate. Because the fast-access playback operation is still performed at faster than play speed (e.g., at 1.5×) but slower than a default rate (e.g., of 8×), the media guidance application may present the content of the media asset between play position 2:45 (min:sec) and 4:45 (min:sec) in the span of five seconds. As such, in such circumstances, a total of two minutes of actual play time of the media asset may be presented to the user in the given duration of five seconds.

In some embodiments, the duration may change based on the content presented at a given play position stored in a viewing history. In some embodiments, the duration may change depending on the type of media asset being consumed. In some embodiments, the duration may be user-configurable or automatically set. In some embodiments, the duration may be set to one value for a first play position stored in the viewing history for a media asset and a second value for a second play position stored in the viewing history.

In some embodiments, the media guidance application may present prompt 220 allowing the user to specify the duration of slowing down a fast-access playback operation. For example, the user may select between duration options 230 using prompt 220. The media guidance application may update a duration field in a database and compute a window for the fast-access playback operation based on the stored duration field. This window may be used to determine at what current fast-access position to slow down the rate of the fast-access playback operation. In some embodiments, prompt 220 may be presented in response to the media guidance application receiving a user request to perform a fast-access playback operation. In some embodiments, prompt 220 may be presented in response to receiving a user request to modify the duration of slowing down a fast-access playback operation.

Figure 3:
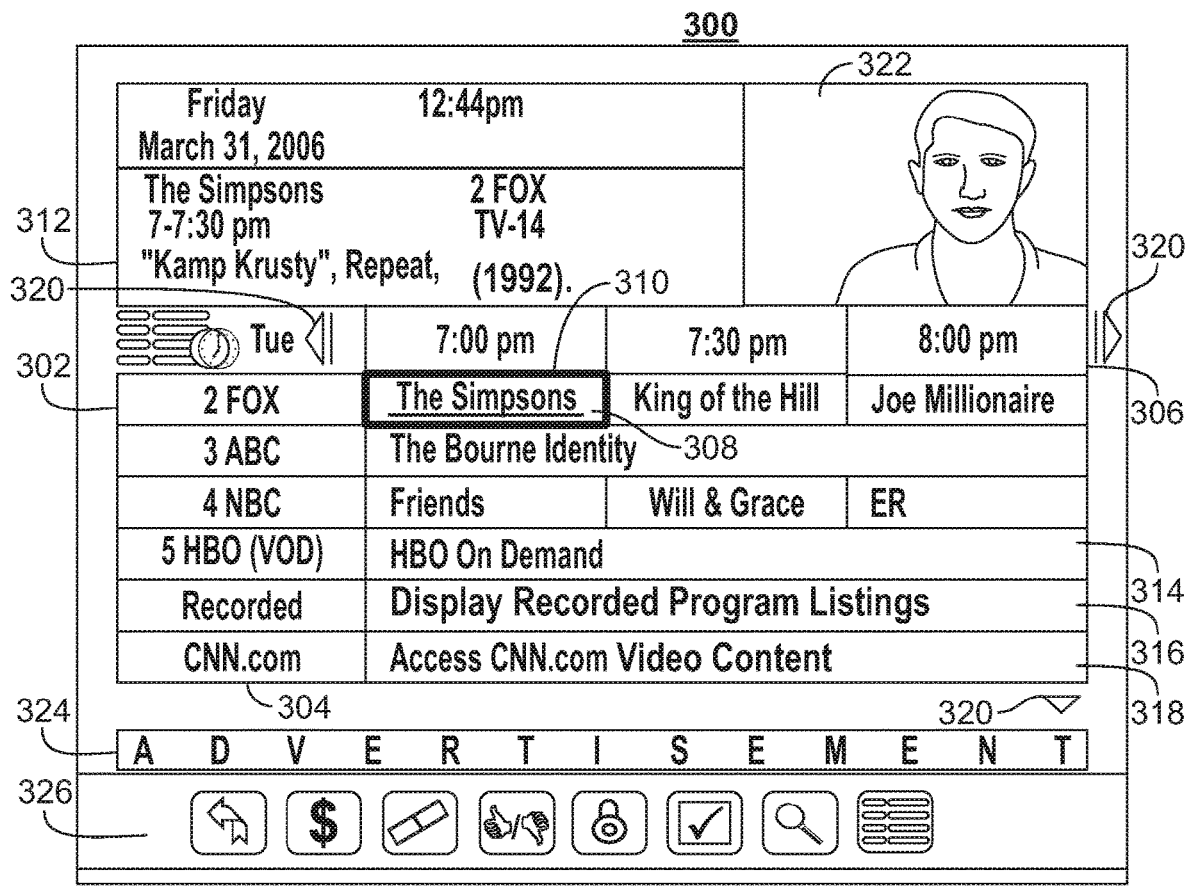
FIGS. 3 and 4 show illustrative display screens that may be used to provide media guidance application listings in accordance with an embodiment of the disclosure.
Figure 4:
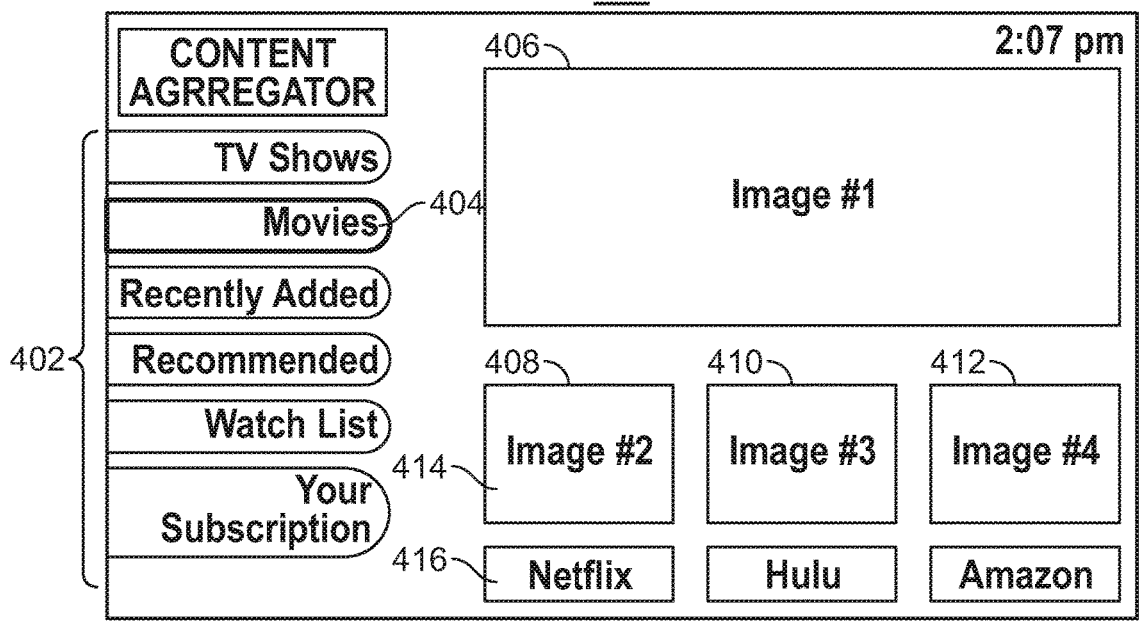

The display screens shown in FIGS. 3-4 may be implemented on any suitable user equipment device or platform. While the displays of FIGS. 3-4 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 3 shows illustrative grid of a program listings display 300 arranged by time and channel that also enables access to different types of content in a single display. In some implementations, the grid of program listings in display 300 may represent only favorite channels of the user. Display 300 may include grid 302 with: (1) a column of channel/content type identifiers 304, where each channel/content type identifier (which is a cell in the column) identifies a different channel or content type available; and (2) a row of time identifiers 306, where each time identifier (which is a cell in the row) identifies a time block of programming. Grid 302 also includes cells of program listings, such as program listing 308, where each listing provides the title of the program provided on the listing's associated channel and time. With a user input device, a user can select program listings by moving highlight region 310. Information relating to the program listing selected by highlight region 310 may be provided in program information region 312. Region 312 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO providing "The Sopranos" and "Curb Your Enthusiasm" via the HBO GO service). THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g., FTP).

Grid 302 may provide media guidance data for non-linear programming including on-demand listing 314, recorded content listing 316, and Internet content listing 318. A display combining media guidance data for content from different types of content sources is sometimes referred to as a "mixed-media" display. Various permutations of the types of media guidance data that may be displayed that are different than display 300 may be based on user selection or guidance application definition (e.g., a display of only recorded and broadcast listings, only on-demand and broadcast listings, etc.). As illustrated, listings 314, 316, and 318 are shown as spanning the entire time block displayed in grid 302 to indicate that selection of these listings may provide access to a display dedicated to on-demand listings, recorded listings, or Internet listings, respectively. In some embodiments, listings for these content types may be included directly in grid 302. Additional media guidance data may be displayed in response to the user selecting one of the navigational icons 320. (Pressing an arrow key on a user input device may affect the display in a similar manner as selecting navigational icons 320.)

Display 300 may also include video region 322, and options region 326. Video region 322 may allow the user to view and/or preview programs that are currently available, will be available, or were available to the user. The content of video region 322 may correspond to, or be independent from, one of the listings displayed in grid 302. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 326 may allow the user to access different types of content, media guidance application displays, and/or media guidance application features. Options region 326 may be part of display 300 (and other display screens described herein), or may be invoked by a user by selecting an on-screen option or pressing a dedicated or assignable button on a user input device. The selectable options within options region 326 may concern features related to program listings in grid 302 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 6. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 4. Video mosaic display 400 includes selectable options 402 for content information organized based on various organization criteria, such as recommendations, inclusion in a watch list, and type of content. In display 400, movie listing option 404 is selected, thus providing listings 406, 408, 410, and 412 as movies. In display 400 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 408 may include more than one portion, including media portion 414 and text portion 416. Media portion 414 and/or text portion 416 may be selectable to view content in full-screen or to view information related to the content displayed in media portion 414 (e.g., to view listings for the specified content provider).

The listings in display 400 are of different sizes (i.e., listing 406 is larger than listings 408, 410, and 412), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 5:
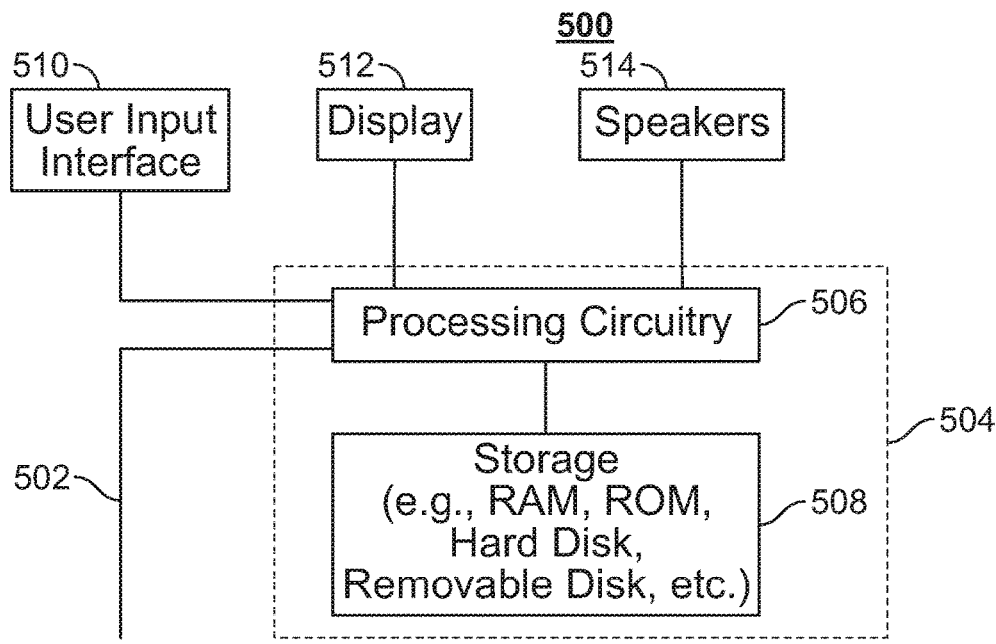
FIG. 5 is a block diagram of an illustrative user equipment device in accordance with some embodiments of the disclosure.

Users may access content and the media guidance application (and its display screens described above and below) from one or more of their user equipment devices. FIG. 5 shows a generalized embodiment of illustrative user equipment device 500. More specific implementations of user equipment devices are discussed below in connection with FIG. 6. Equipment device 500 may be implemented on user television equipment 602, user computer equipment 604, and wireless user communications device 606. Additionally, device 500 may be implemented as part of the servers associated with content providers 616 and 618, and as part of the server associated with content aggregator 630. Device 500 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for a media guidance application stored in memory (i.e., storage 508). Specifically, control circuitry 504 may be instructed by the media guidance application to perform the functions discussed above and below. For example, the media guidance application may provide instructions to control circuitry 504 to generate the media guidance displays. In some implementations, any action performed by control circuitry 504 may be based on instructions received from the media guidance application.

In client-server based embodiments, control circuitry 504 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as media guidance data described above. Nonvolatile memory may also be used (e.g., to launch a boot-up routine and other instructions). Cloud-based storage, described in relation to FIG. 6, may be used to supplement storage 508 or instead of storage 508. For example, storage 508 may be used to store viewing histories and/or maximum viewing progress for various users.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment 500, the tuning and encoding circuitry (including multiple tuners) may be associated with storage 508.

When equipment device 500 is implemented on user television equipment 602, user computer equipment 604, or wireless user communications device 606, a user may send instructions to control circuitry 504 using user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of user equipment device 500. For example, display 512 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive media guidance application and any suitable content may be displayed in 3D. A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of user equipment device 500 or may be stand-alone units. The audio component of videos and other content displayed on display 512 may be played through speakers 514. In some embodiments, the audio may be distributed to a receiver (not shown), which processes and outputs the audio via speakers 514.

The guidance application may be implemented using any suitable architecture. For example, it may be a stand-alone application wholly-implemented on user equipment device 500. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected.

In some embodiments, the media guidance application is a client-server based application. Data for use by a thick or thin client implemented on user equipment device 500 is retrieved on-demand by issuing requests to a server remote to the user equipment device 500. In one example of a client-server based guidance application, control circuitry 504 runs a web browser that interprets HTML web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on equipment device 500. This way, the processing of the instructions is performed remotely by the server while the resulting displays are provided locally on equipment device 500. Equipment device 500 may receive inputs from the user via input interface 510 and transmit those inputs to the remote server for processing and generating the corresponding displays. For example, equipment device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to equipment device 500 for presentation to the user.

In some embodiments, the media guidance application is downloaded and interpreted or otherwise run by an interpreter or virtual machine (run by control circuitry 504). In some embodiments, the guidance application may be encoded in the ETV Binary Interchange Format (EBIF), received by control circuitry 504 as part of a suitable feed, and interpreted by a user agent running on control circuitry 504. For example, the guidance application may be an EBIF application. In some embodiments, the guidance application may be defined by a series of JAVA-based files that are received and run by a local virtual machine or other suitable middleware executed by control circuitry 504. In some of such embodiments (e.g., those employing MPEG-2 or other digital media encoding schemes), the guidance application may be, for example, encoded and transmitted in an MPEG-2 object carousel with the MPEG audio and video packets of a program.

Figure 6:
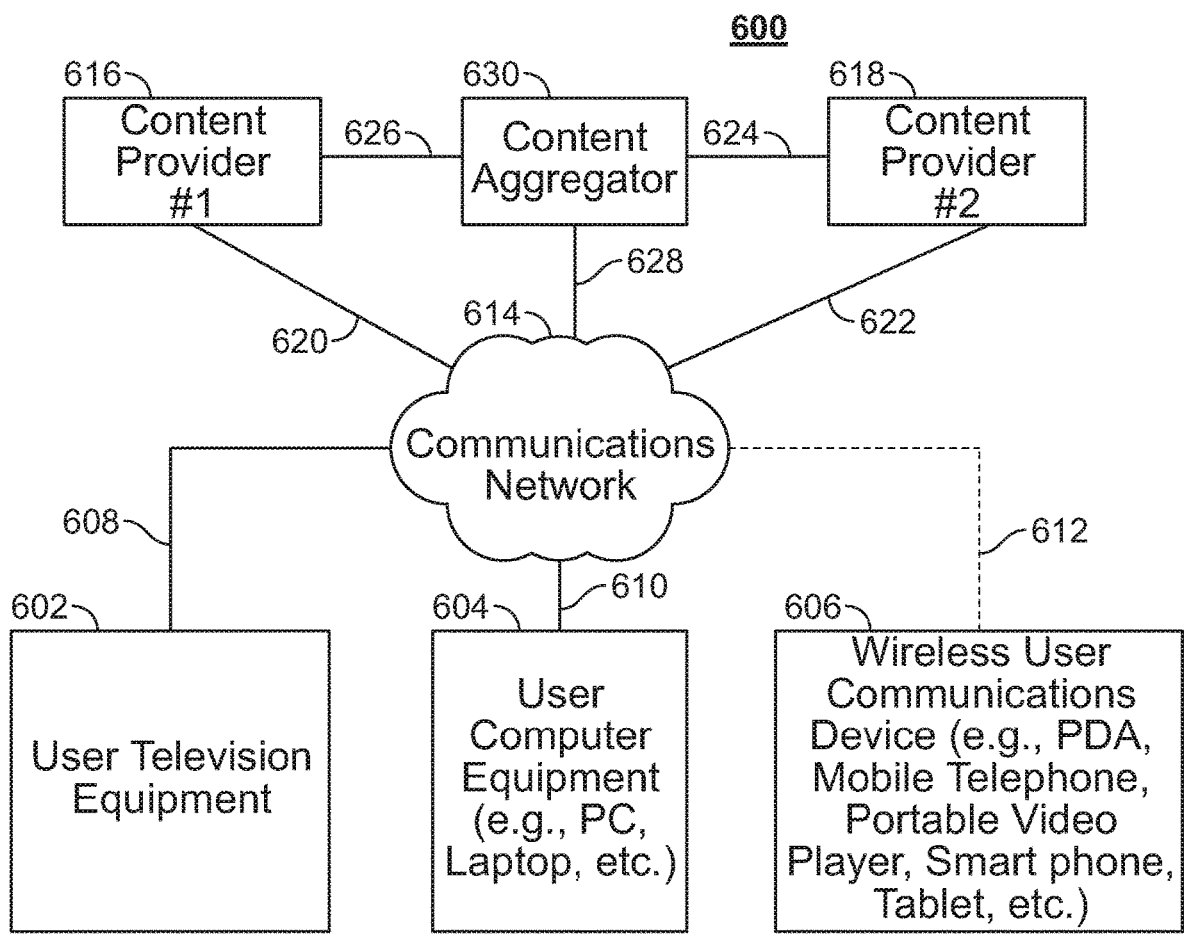
FIG. 6 is a block diagram of an illustrative media system in accordance with some embodiments of the disclosure.

User equipment device 500 of FIG. 5 can be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below. Additionally, equipment device 500 may be implemented as part of the servers associated with content providers 616 and 618, and as part of the server associated with content aggregator 630.

A user equipment device utilizing at least some of the system features described above in connection with FIG. 5 may not be classified solely as user television equipment 602, user computer equipment 604, or a wireless user communications device 606. For example, user television equipment 602 may, like some user computer equipment 604, be Internet-enabled allowing for access to Internet content, while user computer equipment 604 may, like some television equipment 602, include a tuner allowing for access to television programming. The media guidance application may have the same layout on various different types of user equipment or may be tailored to the display capabilities of the user equipment. For example, on user computer equipment 604, the guidance application may be provided as a web site accessed by a web browser. In another example, the guidance application may be scaled down for wireless user communications devices 606.

In system 600, there is typically more than one of each type of user equipment device but only one of each is shown in FIG. 6 to avoid overcomplicating the drawing. In addition, each user may utilize more than one type of user equipment device and also more than one of each type of user equipment device.

In some embodiments, a user equipment device (e.g., user television equipment 602, user computer equipment 604, and wireless user communications device 606) may be referred to as a "second screen device." In some implementations, user television equipment 602, user computer equipment 604, and wireless user communications device 606 may include one or more smartphones and/or tablet devices. For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, viewing progress information, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 614. Namely, user television equipment 602, user computer equipment 604, and wireless user communications device 606 are coupled to communications network 614 via communications paths 608, 610, and 612, respectively. Communications network 614 may be one or more networks including the Internet, a mobile phone network, mobile voice or data network (e.g., a 4G or LTE network), cable network, public switched telephone network, or other types of communications network or combinations of communications networks. Paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6 it is a wireless path and paths 608 and 610 are drawn as solid lines to indicate they are wired paths (although these paths may be wireless paths, if desired). Communications with the user equipment devices may be provided by one or more of these communications paths, but are shown as a single path in FIG. 6 to avoid overcomplicating the drawing.

Although communications paths are not drawn between user equipment devices, these devices may communicate directly with each other via communication paths, such as those described above in connection with paths 608, 610, and 612, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 614.

System 600 includes providers 616 and 618, as well as content aggregator 630 coupled to communications network 614 via communication paths 620, 622, 624, 626 and 628, respectively. Paths 620, 622, 624, 626 and 628 may include any of the communication paths described above in connection with paths 608, 610, and 612. Communications with the content provider 616 and content aggregator 630 may be exchanged over one or more communications paths, but are shown as a single path in FIG. 6 to avoid overcomplicating the drawing. In addition, there may be more than one of each of content provider 616 and content aggregator 630, but only two content providers and one of each content aggregator is shown in FIG. 6 to avoid overcomplicating the drawing. (The different types of each of these sources are discussed below.) Although communications between content providers 616 and 618 with user equipment devices 602, 604, and 606 are shown as through communications network 614, in some embodiments, content providers 616 and 618 may communicate directly with user equipment devices 602, 604, and 606 via communication paths (not shown) such as those described above in connection with paths 608, 610, and 612. In some cases, communications between content providers 616 and 618 with user equipment devices 602, 604, and 606 occur through content aggregator 630. For example, communications between user television equipment 602 and content provider 416 may occur over paths 626, 628, and 608.

Content providers 616 and 618 may include one or more types of content distribution equipment including a television distribution facility, service providers, cable system headend, satellite distribution facility, programming sources (e.g., television broadcasters, such as NBC, ABC, HBO, etc.), intermediate distribution facilities and/or servers, Internet providers, on-demand media servers (e.g., Netflix, Hulu, Amazon, etc.), and other content providers. NBC is a trademark owned by the National Broadcasting Company, Inc., ABC is a trademark owned by the American Broadcasting Company, Inc., and HBO is a trademark owned by the Home Box Office, Inc. Content source 616 may be the originator of content (e.g., a television broadcaster, a Webcast provider, etc.) or may not be the originator of content (e.g., an on-demand content provider, an Internet provider of content of broadcast programs for downloading, etc.). Content provider 616 may include cable sources, satellite providers, on-demand providers, Internet providers, over-the-top content providers, or other providers of content. Content provider 616 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety. In some embodiments, control circuitry 504 implemented on content aggregator 630 may transmit a request over paths 626 and 624 for media guidance data from content providers 616 and 618.

Content aggregator 630 may collect media guidance data (e.g., viewing histories) from content providers 616 and 618, and provide such data, as described above. In some embodiments, content aggregator 630 may be the media application, discussed above and below that collects viewing histories for multiple users. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

Content aggregator 630 may communicate with equipment devices 602, 604, and 606 by way of clients installed on each of the equipment devices. For example, when a user initially subscribes to the content aggregator subscription, control circuitry 504, implemented on content aggregator 630, may facilitate the transfer of a client application to the equipment device. Control circuitry 504, implemented on each of equipment devices 602, 604, and 606, may then download, install, and configure the client application from content aggregator 630. The client application may then facilitate the delivery of media and media guidance data from content aggregator 630 to the equipment devices. The client application may further include a user interface, which control circuitry 504, implemented on equipment device 500, generates for display on display 512, for allowing the user to interact with media listings using user input interface 510, code for handling Digital Rights Management (DRM) data, as well as codecs and players needed for generating media for display on display 512. In some embodiments, the client may be configured to communicate directly with content providers 616 and 618. Content aggregator 630 may include a corresponding communications interface, so that control circuitry 504, implemented on the content aggregator may receive input from the client implemented on each equipment device. Control circuitry 504, implemented on content aggregator 630, may then send and receive data from each client, as well as from each content provider 616 and 618, using the communications interface. Content aggregator 630 may additionally include one or more databases to store subscriber information, viewing history data structures, and media content listings from content providers 416 and 418.

In some embodiments, content aggregator 630 may communicate with equipment devices by way of an Internet browser available on equipment devices 602, 604, and 606. For example, user computer equipment 604 may include an implementation of Internet Explorer. When the user wishes to access media offerings of the content aggregator subscription (e.g., a user may wish to access Netflix listings available as part of the content aggregator subscription to which the user subscribes to), control circuitry 504, implemented on equipment device 604, may output a browser window containing video mosaic display 400 on display 512. Control circuitry 504, implemented on equipment device 604, may then receive a selection from user input interface 510, indicating that the user wishes to access content from a subscription service that is part of the content aggregator subscription. For example, the user may direct a mouse pointer to highlight and select text portion 416 (e.g., Netflix) . Control circuitry 504 implemented on equipment device 604 may then transmit the input corresponding to text portion 416 to the process running the Internet browser, enabling the browser to retrieve and display the Internet web site (e.g., www.netflix.com) associated with the selected subscription service.

In some embodiments, guidance data from content aggregator 630 may be provided to users' equipment using a client-server approach. For example, a user equipment device may pull media guidance data from a server, or a server may push media guidance data to a user equipment device. In some embodiments, a guidance application client residing on the user's equipment may initiate sessions with content aggregator 630 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Content aggregator 630 may provide user equipment devices 602, 604, and 606, the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), viewing progress in one or more media assets, mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year.

Media guidance applications may be, for example, standalone applications implemented on user equipment devices. For example, the media guidance application may be implemented as software or a set of executable instructions which may be stored in storage 508, and executed by control circuitry 504 of a user equipment device 500. In some embodiments, media guidance applications may be client-server applications where only a client application resides on the user equipment device, and server application resides on a remote server. For example, media guidance applications may be implemented partially as a client application on control circuitry 504 of user equipment device 500 and partially on a remote server as a server application (e.g., content aggregator 630) running on control circuitry of the remote server. When executed by control circuitry of the remote server (such as content aggregator 630), the media guidance application may instruct the control circuitry to generate the guidance application displays and transmit the generated displays to the user equipment devices. The server application may instruct the control circuitry of the content aggregator 630 to transmit data for storage on the user equipment. The client application may instruct control circuitry of the receiving user equipment to generate the guidance application displays.

Content and/or media guidance data delivered to user equipment devices 602, 604, and 606 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, AMAZON, and HULU, which provide audio and video via IP packets. Youtube is a trademark owned by Google Inc., Netflix is a trademark owned by Netflix Inc., Amazon is a trademark owned by Amazon Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 600 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 6.

In one approach, user equipment devices may communicate with each other within a home network. User equipment devices can communicate with each other directly via short-range point-to-point communication schemes described above, via indirect paths through a hub or other similar device provided on a home network, or via communications network 614. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content provider 616 to access content. Specifically, within a home, users of user television equipment 602 and user computer equipment 604 may access the media guidance application to navigate among and locate desirable content. Users may also access the media guidance application outside of the home using wireless user communications devices 606 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 614. These cloud resources may include one or more content providers 616 and one or more content aggregators 630. In addition or in the alternative, the remote computing sites may include other user equipment devices, such as user television equipment 602, user computer equipment 604, and wireless user communications device 606. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 604 or wireless user communications device 606 having content capture feature. Alternatively, the user can first transfer the content to a user equipment device, such as user computer equipment 604. The user equipment device storing the content uploads the content to the cloud using a data transmission service on communications network 614. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 5.

FIG. 7 is an illustrative flow diagram 700 for slowing down fast-access playback operations in accordance with some embodiments of the disclosure. At step 710, a viewing history is stored that includes a plurality of play positions within a media asset that are associated with user interactions. For example, the media guidance application may store a viewing history in a storage device. The viewing history may include play positions at which a user interaction was detected.

At step 720, a user request to perform a fast-access playback operation is received while accessing the media asset. For example, a user request to rewind media asset 110 may be received while the user is accessing media asset 110.

At step 730, while performing the fast-access playback operation at a first rate, a determination is made as to whether a current fast-access playback position is within a threshold distance from a given one of the plurality of play positions stored in the viewing history. For example, the media guidance application may perform the requested rewind operation at a first rate (e.g., 8×). While performing the rewind operation at the first rate, the media guidance application may compare a current rewind position within range of a play position (e.g., play position 1:50) associated with one of the play positions (e.g., play position 1:35) in the viewing history. The play position in the range that is compared with the current rewind position may correspond to a play position that is ahead of the play position in the viewing history by a threshold amount.

At step 740, the fast-access playback operation is slowed down from the first rate to a second rate while the current fast-access playback position is within the threshold distance from the given play position. For example, the media guidance application may reduce or slow down the rewind operation from 8× to 1.5× when the rewind position reaches the play position that is within range of the play position stored in the viewing history. In particular, when the rewind position reaches play position 1:50, the media guidance application may automatically reduce the rewind rate to 1.5×. The media guidance application may continue to perform the rewind operation at the reduced rate of 1.5× as the rewind position goes from position 1:50 to play position 1:35 that is stored in the viewing history. After passing play position 1:35 and, in some implementations, exceeding play position 1:35 by a predetermine amount, the media guidance application may resume the rewind operation at the first rate of 8× from the second rate of 1.5×.

Figure 8:
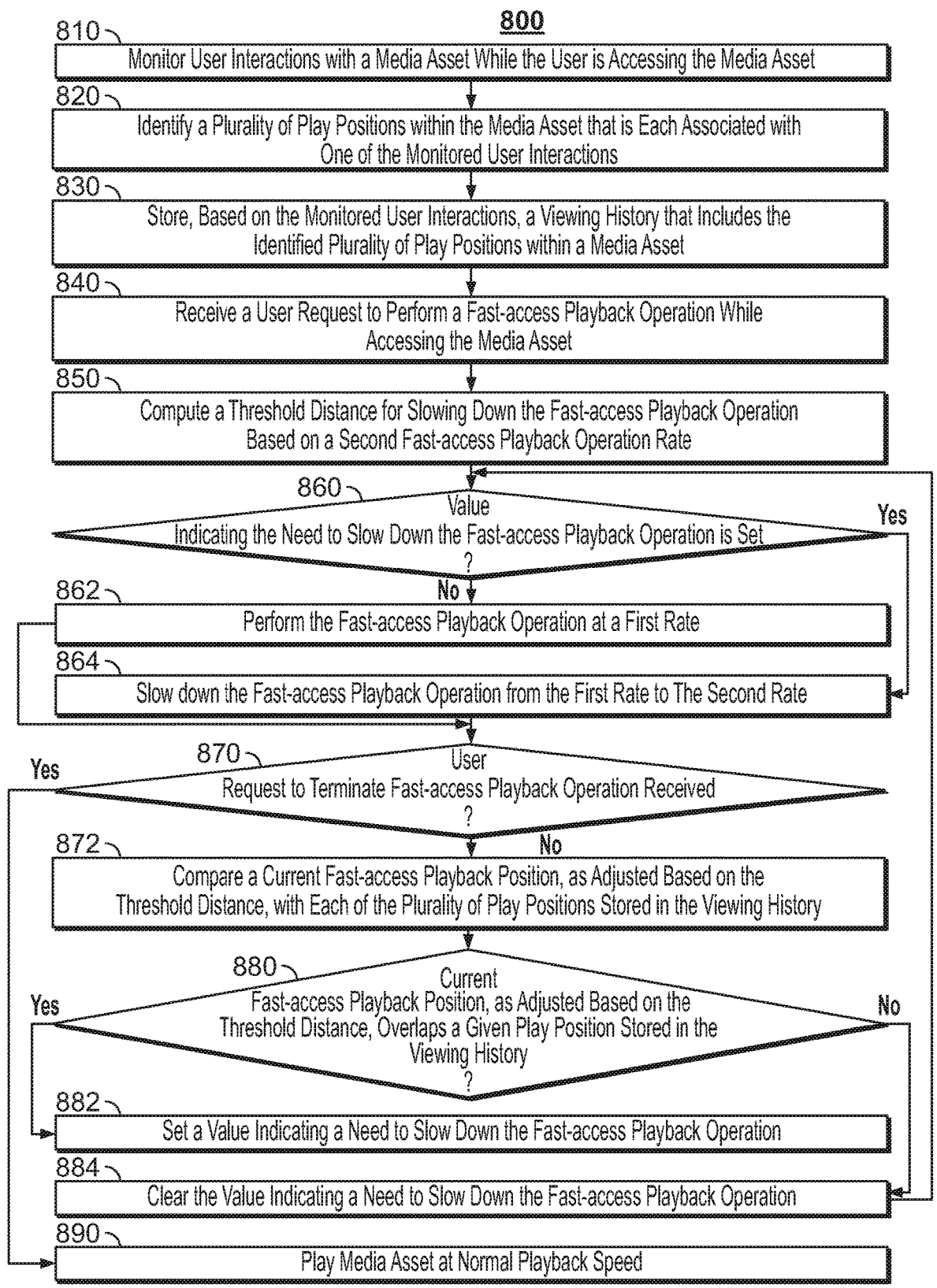

FIG. 8 is an illustrative flow diagram 800 for slowing down fast-access playback operations in accordance with some embodiments of the disclosure. At step 810, user interactions with a media asset are monitored while the user is accessing the media asset. For example, while the user is accessing the media asset, the media guidance application may determine whether the user is posting comments to a social network, requesting fast-access playback operations, pausing, etc. The media guidance application may store each of these interactions in a viewing history associated with the user and the media asset.

At step 820, a plurality of play positions within the media asset that is each associated with one of the monitored user interactions is identified. For example, the media guidance application may identify when each of the determined user interactions took place and retrieve the play position associated with each user interaction.

At step 830, a viewing history is stored, based on the monitored user interactions, that includes the identified plurality of play positions within a media asset. For example, the media guidance application may associate with each interaction stored in the viewing history, the play position of that interaction. In some implementations, the media guidance application may generate a data structure that includes an interaction field and a play position field for each media asset and user. The media guidance application may update the data structure to include each interaction in the interaction field and the play position of that interaction in the play position field.

At step 840, a user request to perform a fast-access playback operation is received while accessing the media asset. For example, a user request to rewind media asset 110 may be received while the user is accessing media asset 110.

Figure 9:
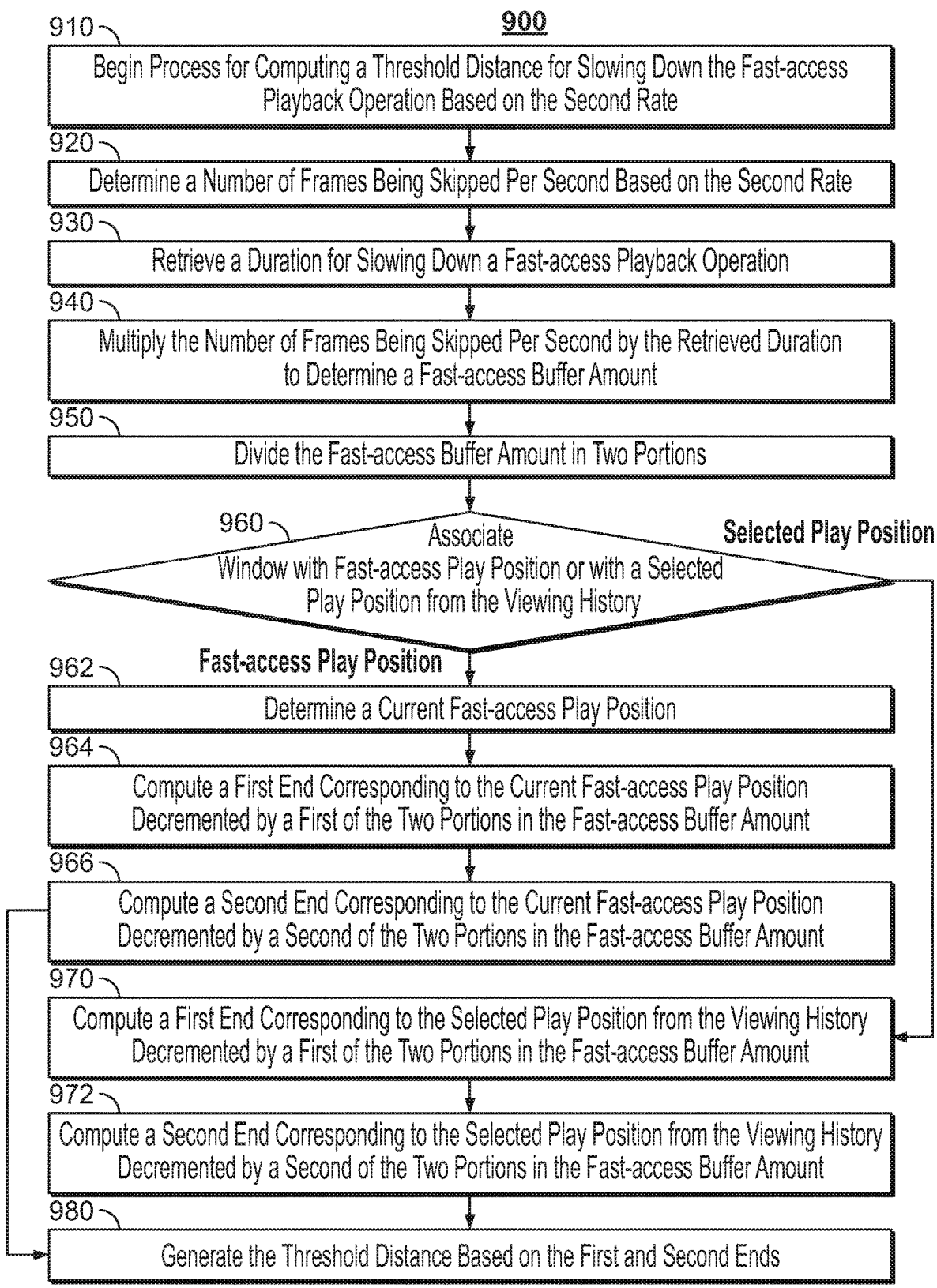

At step 850, a threshold distance for slowing down the fast-access playback operation based on a second fast-access playback operation rate is computed. For example, the media guidance application may identify a range of play positions using a threshold distance that is computed in accordance with process 900 (FIG. 9). The range of play positions may include a set of play positions that precede and follow a given one of the play positions stored in the viewing history and/or a set of play positions that precede and follow the fast-access play position.

At step 860, a determination is made as to whether a value indicating the need to slow down the fast-access playback operation is set. In response to determining that the value is set, the process proceeds to step 864, otherwise the process proceeds to step 862. For example, the media guidance application may retrieve the current value stored in memory that indicates whether or not to slow down a fast-access playback operation. The media guidance application may determine whether the value is equal to '0' (cleared) or '1' (set) to determine if the value is set or cleared.

At step 862, the fast-access playback operation is performed at the first rate. For example, the media guidance application may perform the rewind operation at a first rate of 8×.

At step 864, the fast-access playback operation is slowed down from the first rate to a second rate. For example, the media guidance application may slow down the rewind operation to the second rate of 1.5×.

At step 870, a determination is made as to whether a user request to terminate a fast-access playback operation was received. In response to determining that the user request to terminate a fast-access playback operation was received, the process proceeds to step 890, otherwise the process proceeds to step 872. For example, the media guidance application may determine if the user pressed the STOP, PAUSE, or PLAY button on a remote control to terminate the fast-access playback operation.

At step 872, a current fast-access playback position, as adjusted based on the threshold distance, is compared with each of the plurality of play positions stored in the viewing history. In some implementations, the current fast-access playback position, as adjusted based on the threshold distance, is compared with only some or only one of the plurality of play positions stored in the viewing history (e.g., the furthest or earliest one of the play positions stored in the viewing history). For example, the media guidance application may increment and decrement the rewind position by a threshold amount of play positions and compare this adjusted rewind position to at least one of the play positions stored in the viewing history. In some embodiments, the media guidance application may increment and decrement the play position stored in the viewing history by a threshold amount of play positions and compare this adjusted play position to the current rewind position.

At step 880, a determination is made as to whether the current fast-access play position, as adjusted based on the threshold distance, overlaps a given play position stored in the viewing history. In response to determining that the fast-access play position, as adjusted based on the threshold distance, overlaps the given play position, the process proceeds to step 882, otherwise the process proceeds to step 884.

For example, the media guidance application may determine whether the play position stored in the viewing history is between the position of the rewind position incremented by the threshold amount and decremented by the threshold amount. In particular, the rewind position incremented and decremented by the threshold amount may correspond to the range of play positions between (1:15 and 2:15) when the rewind position is currently at play position 1:45. In such circumstances, the play position (1:30) that is stored in the viewing history is between this range of play positions (e.g., play position 1:30 is between play positions 1:15 and 2:15).

For example, the media guidance application may determine whether the current rewind position is between the play position stored in the viewing history, incremented and decremented by a threshold amount. In particular, the play position stored in the viewing history incremented and decremented by the threshold amount may correspond to the range of play positions between (1:15 and 2:15) when the play position stored in the viewing history is at play position 1:45. In such circumstances, the current rewind position (1:30) is between this range of play positions (e.g., current rewind position 1:30 is between play positions 1:15 and 2:15).

At step 882, the value indicating a need to slow down the fast-access playback operation is set. For example, the media guidance application may update the value stored at the storage location to be equal to '1'.

At step 884, the value indicating a need to slow down the fast-access playback operation is cleared. For example, the media guidance application may update the value stored at the storage location to be equal to '0'.

At step 890, the media asset is played at normal playback speed.

FIG. 9 is an illustrative flow diagram 900 for slowing down fast-access playback operations in accordance with some embodiments of the disclosure. At step 910, the process for computing a threshold distance for slowing down the fast-access playback operation based on the second rate begins.

At step 920, a number of frames being skipped per second based on the second rate is determined.

At step 930, a duration for slowing down a fast-access playback operation is retrieved. For example, the media guidance application may retrieve a default rate (e.g., 5 seconds) and/or may request user input to select a duration. In particular, the media guidance application may present prompt 220 to allow a user to select a duration (FIG. 2).

At step 940, the number of frames being skipped per second is multiplied by the retrieved duration to determine a fast-access buffer amount. For example, the buffer amount may represent a number of frames to place ahead of or behind a given position (play position stored in a viewing history or fast-access position). For example, the buffer amount may represent by how many play positions to increment and/or decrement a given position (play position stored in a viewing history or fast-access position). This fast-access buffer amount in some implementations may identify the number of frames to look ahead and/or behind a given position. This fast-access buffer amount in some implementations may identify amount of playtime to look ahead and/or behind a given position. In such circumstances, the value obtained by multiplying the retrieved duration by the number of frames being skipped per second at the slower second rate may be divided by the number of frames presented at normal play speed (e.g., 24 frames per second) to determine the amount of play time for the buffer amount.

At step 950, the fast-access buffer amount is divided in two portions. These portions may be equal or unequal. For example, the media guidance application may set one portion to be 75% of the buffer amount and the other portion to be 25% of the buffer amount. In particular, if the buffer amount corresponds to 1:30 (min:sec), the media guidance application may set the first amount to be 0:40 and the second amount to be 0:50. In such circumstances, the media guidance application may increment a given play position (stored position in the viewing history or fast-access position) by 0:50 and may decrement the given play position by 0:40. Alternatively, the media guidance application may increment a given play position (stored position in the viewing history or fast-access position) by 0:40 and may decrement the given play position by 0:50.

At step 960, a determination is made as to whether to associate a window with fast-access play position or with a selected play position from the viewing history. In response to determining that the window is to be associated with the fast-access play position, the process proceeds to step 962, otherwise, the process proceeds to step 970.

At step 962, a current fast-access play position is determined.

At step 964, a first end corresponding to the current fast-access play position decremented by a first of the two portions in the fast-access buffer amount is computed.

At step 966, a second end corresponding to the current fast-access play position decremented by a second of the two portions in the fast-access buffer amount is computed.

At step 970, a first end corresponding to the selected play position from the viewing history decremented by a first of the two portions in the fast-access buffer amount is computed.

At step 972, a second end corresponding to the selected play position from the viewing history decremented by a second of the two portions in the fast-access buffer amount is computed.

At step 980, the threshold distance is generated based on the first and second ends.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for performing fast-access playback operations, the method comprising:
   monitoring user interactions with a media asset while the user is accessing the media asset;
   identifying a plurality of play positions within the media asset that is each associated with one of the monitored user interactions;
   storing, based on the monitored user interactions, a viewing history that includes the identified plurality of play positions within a media asset;
   receiving a user request to perform a fast-access playback operation while accessing the media asset;
   performing the fast-access playback operation at a first rate;
   computing a threshold distance for slowing down the fast-access playback operation based on a second rate; and
   while performing the fast-access playback operation:
      comparing a current fast-access playback position, as adjusted based on the threshold distance, with each of the plurality of play positions stored in the viewing history;
      determining whether the current fast-access playback position, as adjusted based on the threshold distance, overlaps a given one of the plurality of play positions stored in the viewing history;
      while the current fast-access playback position, as adjusted based on the threshold distance, overlaps the given play position, setting a value indicating a need to slow down the fast-access playback operation; and
      slowing down the fast-access playback operation from the first rate to the second rate while the value indicating the need to slow down the fast-access playback operation is set.

2. The method of claim 1, wherein monitoring the user interactions comprises determining whether a user request to perform a media guidance function is received while the user is accessing the media asset, wherein the playback function includes at least one of a fast-access playback operation, sharing the media asset, transmitting a social network communication to another user, and pausing the media asset.

3. The method of claim 1, wherein the fast-access playback operation includes at least one of rewinding, fast-forwarding, and skipping segments.

4. The method of claim 1, wherein the threshold distance is proportional to a rate of the fast-access playback operation.

5. The method of claim 1, wherein the threshold distance is selected from one of a plurality of threshold distances, further comprising:
   determining a duration of the media asset;
   partitioning the media asset duration into a plurality of segments;
   associating a first threshold distance of the plurality of threshold distances with a first segment of the plurality of segments; and
   associating a second threshold distance of the plurality of threshold distances with a second segment of the plurality of segments, wherein the second threshold distance is less than the first threshold distance.

6. The method of claim 5, wherein the first segment corresponds to an earlier play position than a play position of the second segment.

7. The method of claim 1 further comprising:
   receiving a user selection of a duration for slowing down a fast-access playback operation rate; and
   adjusting the threshold distance based on the duration selected by the user.

8. The method of claim 1, wherein computing the threshold distance comprises:
   determining a number of frames being skipped per second based on the second rate;
   multiplying the number of frames being skipped per second by a predetermined duration to determine a fast-access buffer amount; and
   computing the threshold distance based on a function of the fast-access buffer amount.

9. The method of claim 8, wherein computing the threshold distance comprises dividing the fast-access buffer amount in half, and wherein determining whether the current fast-access playback position, as adjusted based on the threshold distance, overlaps the given play position comprises:

generating a fast-access playback window for the current fast-access playback position based on the computed threshold distance, wherein a first end of the fast-access playback window corresponds to a first amount of frames that precede the current fast-access playback position by the computed threshold distance, and wherein a second end of the fast-access playback window corresponds to a second amount of frames that follow the current fast-access playback position by the computed threshold distance;

identifying play positions corresponding to the first and second ends of the fast-access playback window; and determining whether the given play position is between the first and second ends of the fast-access playback window to determine whether the current fast-access playback position, as adjusted based on the threshold distance, overlaps the given play position.

10. The method of claim 1 further comprising selecting, as the given play position, one of the plurality of play positions corresponding to a latest point in the media asset.

11. The system of claim 1, wherein the control circuitry is further configured to select, as the given play position, one of the plurality of play positions corresponding to a latest point in the media asset.

12. A system for performing fast-access playback operations, the system comprising:
control circuitry configured to:
monitor user interactions with a media asset while the user is accessing the media asset;
identify a plurality of play positions within the media asset that is each associated with one of the monitored user interactions;
store, based on the monitored user interactions, a viewing history that includes the identified plurality of play positions within a media asset;
receive a user request to perform a fast-access playback operation while accessing the media asset;
perform the fast-access playback operation at a first rate;
compute a threshold distance for slowing down the fast-access playback operation based on a second rate; and
while performing the fast-access playback operation:
compare a current fast-access playback position, as adjusted based on the threshold distance, with each of the plurality of play positions stored in the viewing history;
determine whether the current fast-access playback position, as adjusted based on the threshold distance, overlaps a given one of the plurality of play positions stored in the viewing history;
while the current fast-access playback position, as adjusted based on the threshold distance, overlaps the given play position, set a value indicating a need to slow down the fast-access playback operation; and
slow down the fast-access playback operation from the first rate to the second rate while the value indicating the need to slow down the fast-access playback operation is set.

13. The system of claim 12, wherein the control circuitry configured to monitor the user interactions is further configured to determine whether a user request to perform a media guidance function is received while the user is accessing the media asset, wherein the playback function includes at least one of a fast-access playback operation, sharing the media asset, transmitting a social network communication to another user, and pausing the media asset.

14. The system of claim 12, wherein the fast-access playback operation includes at least one of rewinding, fast-forwarding, and skipping segments.

15. The system of claim 12, wherein the threshold distance is proportional to a rate of the fast-access playback operation.

16. The system of claim 12, wherein the threshold distance is selected from one of a plurality of threshold distances, and wherein the control circuitry is further configured to:
determine a duration of the media asset;
partition the media asset duration into a plurality of segments; associate a first threshold distance of the plurality of threshold distances with a first segment of the plurality of segments; and
associate a second threshold distance of the plurality of threshold distances with a second segment of the plurality of segments, wherein the second threshold distance is less than the first threshold distance.

17. The system of claim 16, wherein the first segment corresponds to an earlier play position than a play position of the second segment.

18. The system of claim 12, wherein the control circuitry is further receive a user selection of a duration for slowing down a fast-access playback operation rate; and
adjust the threshold distance based on the duration selected by the user.

19. The system of claim 12, wherein the control circuitry configured to compute the threshold distance is further configured to:
determine a number of frames being skipped per second based on the second rate;
multiply the number of frames being skipped per second by a predetermined duration to determine a fast-access buffer amount; and
compute the threshold distance based on a function of the fast-access buffer amount.

20. The system of claim 19, wherein the control circuitry configured to compute the threshold distance is further configured to divide the fast-access buffer amount in half, and wherein the control circuitry configured to determine whether the current fast-access playback position, as adjusted based on the threshold distance, overlaps the given play position is further configured to:
generate a fast-access playback window for the current fast-access playback position based on the computed threshold distance, wherein a first end of the fast-access playback window corresponds to a first amount of frames that precede the current fast-access playback position by the computed threshold distance, and wherein a second end of the fast-access playback window corresponds to a second amount of frames that follow the current fast-access playback position by the computed threshold distance;
identify play positions corresponding to the first and second ends of the fast-access playback window; and
determine whether the given play position is between the first and second ends of the fast-access playback window to determine whether the current fast-access playback position, as adjusted based on the threshold distance, overlaps the given play position.

\* \* \* \* \*